(12) United States Patent
Rimboeck et al.

(10) Patent No.: US 11,981,575 B2
(45) Date of Patent: May 14, 2024

(54) RECYCLING OF MATERIALS CONTAINING ORGANOSILICON COMPOUNDS

(71) Applicant: WACKER CHEMIE AG, Munich (DE)

(72) Inventors: Karl-Heinz Rimboeck, Heldenstein (DE); Konrad Mautner, Burghausen (DE)

(73) Assignee: WACKER CHEMIE AG, Munich (DE)

( * ) Notice: Subject to any disclaimer, the term of this patent is extended or adjusted under 35 U.S.C. 154(b) by 0 days.

(21) Appl. No.: 17/295,057

(22) PCT Filed: Mar. 5, 2019

(86) PCT No.: PCT/EP2019/055459
§ 371 (c)(1),
(2) Date: May 19, 2021

(87) PCT Pub. No.: WO2020/177861
PCT Pub. Date: Sep. 10, 2020

(65) Prior Publication Data
US 2024/0010501 A1    Jan. 11, 2024

(51) Int. Cl.
*C01B 33/025* (2006.01)
(52) U.S. Cl.
CPC ........ *C01B 33/025* (2013.01); *C01P 2004/61* (2013.01)
(58) Field of Classification Search
None
See application file for complete search history.

(56) References Cited

U.S. PATENT DOCUMENTS

| 8,221,507 B2 | 7/2012 | Nickel et al. |
| 2009/0281202 A1 | 11/2009 | Eyster et al. |
| 2011/0262339 A1 | 10/2011 | Rauleder et al. |

FOREIGN PATENT DOCUMENTS

| DE | 19502393 A1 | 8/1996 |
| DE | 102005033063 B3 | 1/2007 |
| EP | 0523323 B1 | 6/1997 |
| JP | 63-129009 A | 6/1988 |
| JP | 2012020920 A | 2/2012 |
| WO | 2009002636 A1 | 12/2008 |
| WO | 2010037709 A2 | 4/2010 |
| WO | WO 2010/037709 A2 | 4/2010 |
| WO | 2013080981 A1 | 6/2013 |
| WO | WO 2013/080981 A1 | 6/2013 |

OTHER PUBLICATIONS

Tveit et al., Production of high silicon alloys, Chapter 1, 1998 (Tveit) (Year: 1998).*
Anders Schei et al., Production of High Silicon Alloys, 1998, Tapir Akademisk Forlag, Wacker Chemie AG, Burghausen, Germany.
Database WPI, 2017, XP-002796108, Thomson Scientific.

* cited by examiner

Primary Examiner — Coris Fung
Assistant Examiner — Keling Zhang
(74) Attorney, Agent, or Firm — BROOKS KUSHMAN P.C.

(57) ABSTRACT

Silicon and silica values are obtained from recycled organosilicon products such as silicones, by introducing a recycle feed containing the organosilicon products into an electric furnace while producing metallurgical grade silicon from a silica source and a carbon source.

6 Claims, No Drawings

RECYCLING OF MATERIALS CONTAINING ORGANOSILICON COMPOUNDS

CROSS REFERENCE TO RELATED APPLICATIONS

This application is the U.S. National Phase of PCT Appln. No. PCT/EP2019/055459 filed Mar. 5, 2019, in which the disclosure is incorporated in its entirety by reference herein.

BACKGROUND OF THE INVENTION

1. Field of the Invention

The invention relates to a process for producing metallurgical silicon in an electric furnace, wherein organosilicon compounds are added.

2. Description of the Related Art

Large amounts of so-called "end-of-life" polymers as well as byproducts/waste products in the production of polymers are landfilled, thermally recovered or converted into products of lower quality by downcycling. By contrast, only small amounts of the abovementioned polymers are truly recycled in the sense of a greatest possible recycling into the value chain. New processes are required for a more sustainable, resource-saving and environmentally friendly handling of the abovementioned materials. For the case of silicones as representatives of polymeric materials the prior art predominantly describes processes following the depolymerization-polymerization approach; i.e.: depolymerization of polysiloxanes into short-chain or cyclic siloxane building blocks which may subsequently be reprocessed into a multiplicity of products. Disadvantages of the known processes include especially the incomplete recovery of usable chemical compounds and/or substances and the high cost and complexity of obtaining the abovementioned compounds at all.

DE19502393 A1 describes a process for depolymerization of addition-crosslinked silicone rubber vulcanizate, wherein in a first step a solution of acid in solvent diffuses into the silicone rubber vulcanizate, in a second step the solvent is evaporated and in a third step the silicone rubber vulcanizate is heated to at least 350° C. The disadvantage of this process is that the silicone rubber vulcanizate is incompletely reacted and the valuable silica filler is not recovered.

US2009281202 discloses a solvent-free process for depolymerization of polymeric silicone materials to recover cyclic or monomeric units. Here too, the substrate to be recycled is incompletely reacted. In addition, an acidic pre-decomposition and additional apparatus complexity are necessary to achieve solvent-free depolymerization after the acidic pretreatment.

A process for cracking a high molecular weight silicone polymer obtained from silicone waste to afford cyclic silicone compounds is disclosed in EP0523323 B1. The process comprises three essential sub-steps of dissolving in an organic solvent containing an oxoacid of sulfur and subsequent heating of the mixture, addition of a hydroxide base at elevated temperature and obtaining the cyclic silicone compound by distillation of the mixture. According to the patent specification the process preferred according to the invention does achieve a high degree of recovery at 80-95% of the available silicone but no solution to the problem of further processing the silica value product also present in the starting material is disclosed. Accordingly only 45-55% of the starting material is recycled and reintroduced to the value chain based on the total mass of the starting material. In order to also obtain the remaining proportions, costly and complex separation and/or purification steps must be carried out which in turn generate wastes.

Also described are processes in which a separation step must be performed before the actual recycling. Such a case is described for example in DE102005033063 B3. The process described therein entails complex process engineering and the resulting silicone oil requires a further purification before it may be sent to a use.

SUMMARY OF THE INVENTION

The present invention provides a process for producing metallurgical silicon, wherein a mixture of a raw material mixture containing silicon dioxide and carbon and a recycle feed containing organosilicon compounds is reacted in an electric furnace.

DETAILED DESCRIPTION OF THE PREFERRED EMBODIMENTS

The process allows the greatest possible utilization of recyclable organosilicon compounds and materials containing organosilicon compounds in the context of a recycling into the industrial value chain based on the chemically bonded energy and the chemically bonded elements Si, O and C.

The option of direct use of the organosilicon compounds and materials containing organosilicon compounds generated as byproducts and/or as waste offers a great economic advantage. The single- or multi-stage chemical workup and the subsequent complex separation processes to obtain the organosilicon compounds are avoided. Costs for disposal of the organosilicon compounds and materials containing organosilicon compounds are likewise avoided. The purchase of raw materials for production of industrial quality silicon may also be reduced. There are moreover no additional complex apparatuses and/or plants that must necessarily be added to the apparatus inventory of a producer of metallurgical silicon.

Use of the organosilicon compounds in the production of metallurgical silicon makes markedly more products available than the depolymerization-polymerization approach; thus metallurgical silicon may be used to produce a multiplicity of silanes which are in turn starting materials for a very wide variety of product groups, such as ultrapure silicon, silicon elastomers, silicone oils, functional siloxanes, silicone resins, silicone resin formulations, linear and cyclic polydimethylsiloxanes and silicates, and represent applications in semiconductors, electronics, pharmaceuticals, foodstuffs and cosmetics for example.

Processes for producing metallurgical silicon are in principle complex and energy intensive. The required supply of energy, which is generally effected by electrical means, represents a considerable cost factor. The operational performance of the carbothermal reduction of silicon dioxide in an electric furnace depends decisively on the raw materials and the corresponding formulations in which the raw materials are supplied to the reduction process. It was therefore surprising that material containing organosilicon compounds can be used to produce metallurgical silicon, i.e. industrial quality silicon, without reducing the productivity of the process and the quality of the product.

The recycle feed is a mixture containing organosilicon compounds and optionally silicon dioxide and optionally further substances. The organosilicon compounds may be present in materials containing organosilicon compounds. Typical materials containing organosilicon compounds are silicone rubbers containing polysilicones as the organosilicon compounds and silicas as the silicon dioxide.

Materials containing organosilicon compounds may contain any form of organosilicon compounds and mixtures of organosilicon compounds. Example forms of organosilicon compounds include: Organosilicon compounds that are solid at 20° C., that are resinous or that are oily or liquid.

The organosilicon compounds are preferably organopolysiloxanes, also known as silicones. The term silicones refers to oligomeric or polymeric compounds in which silicon atoms are bonded via oxygen atoms and in which the silicon atoms bear one or more organic substituents.

In a preferred embodiment the organosilicon compounds are silicones preferably bearing silicon-bonded hydrocarbyl radicals, having 1 to 20, preferably 1 to 16, particularly preferably 1 to 12, in particular 1 to 10, carbon atoms per hydrocarbyl radical. The silicones are especially polydimethylsiloxanes.

The recycle feed may contain not only organosilicon compounds but also fillers/binders. Preferred fillers are pyrogenic and/or precipitated silica as an admixture in the silicones and so-called microsilica, generated as a byproduct in the production of industrial silicon, as a binder.

The recycle feed may be liquid or solid. The recycle feed is preferably particulate.

In the case of a multicomponent mixture the individual organosilicon compounds and materials containing organosilicon compounds may each be present as homogeneous particles and/or particles may be specifically produced from the individual materials, for example by compacting, for example by pressing, pelletizing, briquetting or sintering. The compacting of organosilicon compounds and materials containing organosilicon compounds is advisable especially when particles having a particle size <1 mm are present and/or when at least one organosilicon compound or material containing organosilicon compound is unsuitable for use as a recycle feed on account of its nature, for example excessive porosity, insufficient density or insufficient viscosity.

The particle mixture of the recycle feed preferably has a particle size parameter $d_{50}$ of at least 1 mm, more preferably from 1 to 150 mm, most preferably from 2 to 100 mm, and especially from 5 to 50 mm. Particles having a particle size of <1 mm are in some cases entrained and thus withdrawn from the process via the offgas system on account of the prevailing, relatively high gas velocities with which the gasses flow through the furnace and finally exit as offgas. Discharging of raw materials and/or of the recycle feed reduces economy and also jeopardizes process performance.

The content of organosilicon compounds in the recycle feed is determined for example by mass spectrometry-coupled gas chromatography.

In the process the silicon dioxide in the raw material mixture is preferably selected from quartz and quartzite. In the process the carbon in the raw material mixture is preferably selected from coke, petroleum coke, bituminous coal, charcoal and wood particles.

The silicon content of the silicon dioxide is preferably determined by x-ray fluorescence analysis. Preferably determined as secondary constituents are: Fe, Al, Ca, Ti, K and Mg.

The preferred molar ratio between Si from silicon dioxide and "fixed carbon" ($C_{fixed}$) in the raw material mixture is in the range from 0.2 to 0.7, more preferably from 0.3 to 0.6, yet more preferably from 0.35 to 0.55, and especially from 0.4 to 0.5.

The term "fixed carbon" (C fixed) is to be understood as meaning the solid, flammable residue of a C-containing material that remains after heating a sample at 900° C. for a period of seven minutes to deplete its volatile constituents. $C_{fixed}$ may be determined using a LECO TGA701 instrument for example (http://www.leco.co.za/wp-content/uploads/2012/02/TGA701 COKE 203-821-381.pdf; sample preparation according to ASTM Method D2013 or ASTM Practice D346).

The proportion of the recycle feed in the process based on the sum of the raw material mixture and the recycle feed is preferably not more than 20% by weight, particularly preferably not more than 15% by weight, very particularly preferably not more than 10% by weight, especially not more than 5% by weight, but at least 1% by weight.

The recycle feed preferably contains at least 50% by weight, more preferably at least 60% by weight, yet more preferably at least 70% by weight, and especially at least 80% by weight of organosilicon compounds. The remaining weight fractions of the materials containing organosilicon compounds are preferably substances present as fillers and/or binders for example. These substances preferably have a heat value of not more than 120 MJ/kg.

The constituents of the raw material mixture and the recycle feed may be introduced to the furnace together or separately from one another. The addition may be carried out manually or automatically.

The temperature in the electrical furnace is preferably at least 1900° C. It is preferably operated at atmospheric pressure.

The production of metallurgical silicon is described in detail in the standard text "Production of High Silicon Alloys" (A. Schei, J. K. Tuset, H. Tveit, *Production of High Silicon Alloys*, 1998, Tapir forlag, Trondheim).

$$SiO_2 + 2C \rightarrow Si(l) + 2CO(g) \quad (1)$$

During production the reactants, intermediates and products are present in different phases of matter: solid (C, SiC, $SiO_2$, Si), liquid (Si, $SiO_2$) and gaseous (predominantly CO, SiO). A strongly reducing atmosphere composed especially of SiO and CO prevails in the furnace. During operation $SiO_2$ and C move downwards while SiO and CO flow upwards. Intermediate species are formed according to the following reaction equations (2)-(7):

$$SiO_2 + C \rightarrow SiO + CO \quad (2)$$

$$SiO + 2C \rightarrow SiC + CO \quad (3)$$

$$SiO_2 + 2SiC \rightarrow 3Si + 2CO \quad (4)$$

$$2SiO_2 + SiC \rightarrow 3SiO + CO \quad (5)$$

$$SiO_2 + CO \rightarrow SiO + CO_2 \quad (6)$$

$$2CO_2 + SiC \rightarrow SiO + 3CO \quad (7)$$

Silicon is predominantly formed by the reaction shown in reaction (8).

$$SiO + SiC \rightarrow 2Si + CO \quad (8)$$

Mixtures of particulate substances having a particle diameter of predominantly >0.1 mm are typically subjected to sieve analyses to characterize the particle mixture. Determination of particle size distribution by sieve analysis is carried out according to DIN 66165. Calculation of average particle sizes/diameters from particle size distributions may be carried out according to DIN ISO 9276-2.

Examples

Various batch compositions were employed in an arc reduction furnace—in each case over a production day—and the performance of the process was measured by reference to the formation of the by-product microsilica. The Si quantity equivalent quotient [microsilica]/Si quantity equivalent [batch] was determined for one production day. This quotient is referred to hereinbelow as the loss quotient (LQ). At an LQ value of 0.15 or less the process is considered particularly productive. Different particulate recycle feeds were tested in different mixture ratios. Unless otherwise stated the recycle feed was employed as a particulate mixture having a $d_{50}$ between 25 and 35 mm. Table 1 gives an overview of the recycle feeds employed and Table 2 summarizes the results of the examples.

The batches consisted of: raw material mixture ($SiO_2$ source and C-containing reductant; Si:fixed C molar ratio=0.4-0.5) and optionally particulate recycle feed.

Fixed C was determined using a LECO TGA701 instrument and sample preparation was carried out according to ASTM Method D2013.

The silicon content of the $SiO_2$ source was determined by X-ray fluorescence analysis. The following elements were analyzed as secondary constituents: Fe, Al, Ca, Ti, K and Mg.

The content of organosilicon compounds in the recycle feed was determined by mass spectrometry-coupled gas chromatography.

TABLE 1

| Recycle feed | Silicone proportion | Secondary constituents |
| --- | --- | --- |
| A | 80% by wt. | 19% by wt. pyrogenic silica 1% by weight substance [heat value <120 MJ/kg] |
| B | 80% by wt. | 10% by wt. pyrogenic silica 10% by wt. substance [heat value <120 MJ/kg] |
| C | 80% by wt. | 20% by wt. microsilica |
| D | 70% by wt. | 30% by wt. pyrogenic silica |

TABLE 1-continued

| Recycle feed | Silicone proportion | Secondary constituents |
| --- | --- | --- |
| E | 60% by wt. | 40% by wt. microsilica |
| F | 40% by wt. | 60% by wt. microsilica |

TABLE 2

| Example | Recycle feed proportion in batch | Recycle feed | LQ |
| --- | --- | --- | --- |
| CE* | — | — | 0.09 |
| 1 | 35% by wt. | C | 0.30 |
| 2 | 30% by wt. | C | 0.24 |
| 3 | 25% by wt. | C | 0.21 |
| 4 | 20% by wt. | C | 0.15 |
| 5 | 10% by wt. | C | 0.13 |
| 6 | 5% by wt. | C | 0.11 |
| 7 | 1% by wt. | C | 0.10 |
| 8 | 5% by wt. | E | 0.12 |
| 9 ** | 5% by wt. | E | 0.15 |
| 10 *** | 5% by wt. | E | 0.14 |
| 11 | 5% by wt. | A | 0.13 |
| 12 | 5% by wt. | B | 0.11 |
| 13 | 5% by wt. | D | 0.12 |
| 14 | 5% by wt. | F | 0.17 |

*noninventive
**d50 between 100 and 150 mm
*** d50 between 50 and 75 mm

The invention claimed is:

1. A process for producing metallurgical silicon, comprising:
reacting in an electric furnace, a mixture comprising:
a raw material mixture containing silicon dioxide and carbon, and
a recycle feed containing organosilicon compounds, and recovering metallurgical grade silicon.

2. The process of claim 1, wherein the recycle feed contains at least 50% by weight of organosilicon compounds.

3. The process of claim 1, wherein the recycle feed is a particle mixture whose particle size parameter $d_{50}$ is at least 1 mm.

4. The process of claim 1, wherein the silicon dioxide in the raw material mixture comprises quartz and/or quartzite.

5. The process of claim 1, wherein the carbon in the raw material mixture comprises coke, petroleum coke, bituminous coke, charcoal, wood particles, or mixtures thereof.

6. The process of claim 1, wherein the proportion of the recycle feed based on the sum of the raw material mixture and the recycle feed is not more than 20% by weight.

* * * * *